ATTORNEYS

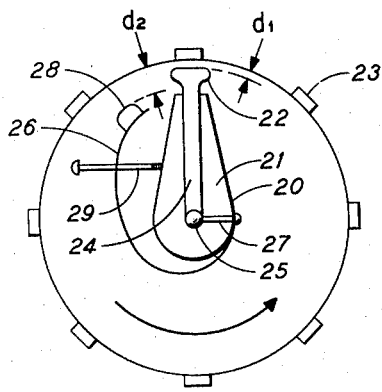
FIG. 2-A
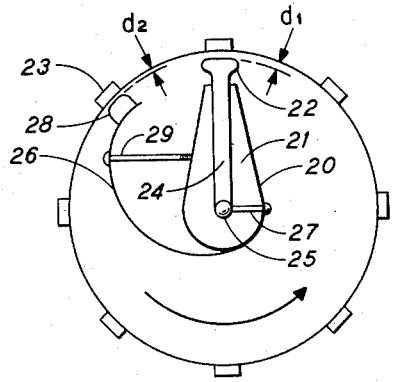
FIG. 2-B
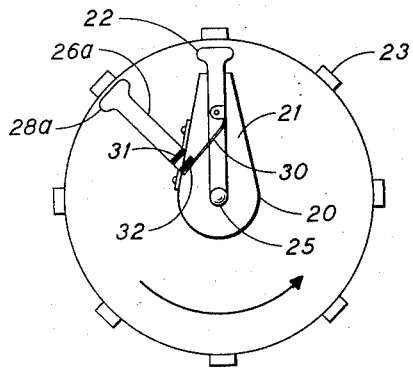
FIG. 3-A
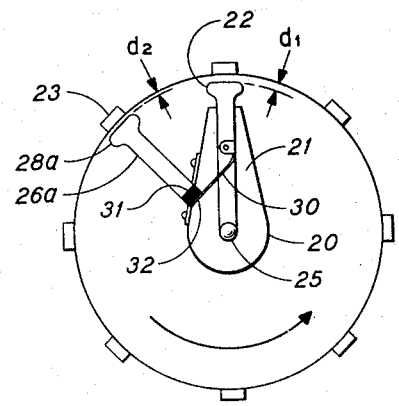
FIG. 3-B
INVENTORS
HARRISON W. SIGWORTH
EDWARD J. McLAUGHLIN
BY Frank E. Johnston
   Walter G. Muller
ATTORNEYS INVENTORS
HARRISON W. SIGWORTH
EDWARD J. McLAUGHLIN BY Frank E. Johnston
Walter G. Muller

July 15, 1958

H. W. SIGWORTH ET AL 2,843,645

METHOD AND APPARATUS FOR REMOVING
COMBUSTION CHAMBER DEPOSITS

Original Filed June 29, 1953

INVENTORS
HARRISON W. SIGWORTH
EDWARD J. McLAUGHLIN

BY  Frank E. Johnston
    Walter G. Miller

ATTORNEYS

United States Patent Office 2,843,645
Patented July 15, 1958

---

2,843,645

METHOD AND APPARATUS FOR REMOVING COMBUSTION CHAMBER DEPOSITS

Harrison W. Sigworth and Edward J. McLaughlin, El Cerrito, Calif., assignors to California Research Corporation, San Francisco, Calif., a corporation of Delaware Original application June 29, 1953, Serial No. 364,796. Divided and this application August 30, 1957, Serial No. 681,217

4 Claims. (Cl. 123—148)

The present invention relates to methods of removing deposits from combustion chambers of internal combustion engines, more particularly to methods of removing combustion chamber deposits from the combustion chambers of operating spark-ignition internal combustion engines, and has for an object the provision of methods and apparatus for removing combustion chamber deposits by radically advancing the spark of a spark-ignition engine during operation thereof in order to increase the power output and decrease the octane requirement without removal of the cylinder heads of the engines.

This case is a division of our co-pending application Serial No. 364,796, filed June 29, 1953, entitled "Method and Apparatus for Removing Combustion Chamber Deposits."

In the operation of high-compression internal combustion engines of the spark-ignition type, such as those used in present-day automobiles, buses, trucks and boats, a commonly observed phenomenon after a few hours of operation is an increase in octane requirement and an accompanying decrease in power resulting from the accumulation of deposits in the combustion chambers of the engine. These deposits result from the burning of gasolines, especially those containing tetraethyl lead as an anti-knock agent, and a small amount of lubricating oil in the combustion chambers of the engine under normal operating conditions. Primarily these deposits are composed of carbon and lead, but, additionally, they may contain minor percentages of other materials, such as metals from the lubricating oil compounding, hydrogen, sulfur, chlorine, bromine, silicon and iron.

In recent years, designers and manufacturers of spark-ignition, internal combustion engines have found it advantageous to increase the compression ratios in order to increase engine efficiencies. However, with increased compression ratios there is an accompanying increase in octane requirement when the engine is clean, and under normal operating conditions the octane requirement of the engine progressively increases to an equilibrium requirement several octane numbers higher than the original, clean, requirement due to the above-mentioned combustion chamber deposits. In present-day commercial practice, this increase in octane requirement may easily increase sufficiently so that the engine cannot be operated without knock on commercially available fuels under some operating conditions.

It has been found experimentally that the octane requirement of an automobile engine increases from a clean condition to an equilibrium condition by about 4 to 15 octane numbers, with an average of about 8 numbers, as a result of build-up of combustion chamber deposits. Such increases will, of course, depend upon the design of the engine, and the time required for the build-up will depend upon the operating conditions under which the engine is run. It has been estimated that the annual cost to the petroleum industry of raising the octane level of all motor gasolines by one number is several million dollars. Conversely, a reduction in octane requirement for automobile engines by a similar amount would represent a corresponding saving to the industry and ultimately the automobile operator. This saving is in the cost of octane numbers alone and without regard to the power loss of 4 to 20% which normally accompanies a build-up of combustion chamber deposits.

The power increase accompanying a reduction in octane requirement represents an additional advantage which would accrue to the operator of the equipment employing a spark-ignition engine.

Heretofore, one of the most effective methods of removing deposits from combustion chambers of an internal combustion engine included removal of the cylinder head of the engine. Such an operation is very expensive in time and money so that it can often be justified only when overhaul or repair of the engine is required. This is particularly true of valve-in-head engines wherein more of the engine must be disassembled to reach the combustion chambers.

Other methods have been suggested for removing combustion chamber deposits, such as the introduction of rice or walnut shells, using an air-blast. The disadvantages of these methods reside in the length of time required for effective carbon removal from all cylinders and high cost of necessary air-blast equipment.

Another method suggested for cleaning the combustion chambers of an internal combustion engine is disclosed in the patent application of John G. Mingle, Jr., Serial No. 203,220, filed December 28, 1950, for "Removal of Combustion-Chamber Deposits in Spark Ignition Engines," assigned to the assignee of the present invention, now abandoned. As disclosed therein, fuels other than tank fuel are introduced into the intake manifold of the engine and the engine operated for a predetermined time. While the method of the above-identified application is highly successful in removing combustion chamber deposits, this method requires the introduction of particular materials as fuel for the engine.

In accordance with the present invention, there is provided a method of removing combustion chamber deposits from each cylinder of an operating spark-ignition internal combustion engine while operating the engine on tank or normal fuel by radically advancing the spark to each cylinder so that substantially all of the combustible mixture normally drawn into each combustion chamber is burned while the piston associated therewith is on the compression stroke, and then maintaining the hot combustion products from the burned mixture in the chamber during the power stroke of the piston.

In a preferred method of carrying out the present invention, the combustible mixture in each cylinder is ignited at a point between about 10 degrees before bottom dead center on the intake stroke of the piston associated with the chamber and 45 degrees before normal spark ignition of the combustible mixture. The angles referred to hereinabove are measured by the rotation of the crank shaft driven by the pistons associated with the respective chambers of the engine. The burning mixture and the combustion products are maintained in the engine combustion chamber during both a substantial part of the compression stroke and the following power stroke. Desirably the method includes operating the engine at substantially full throttle without external load on the engine and for a period of time such that the coolant for the engine does not exceed its boiling point temperature.

While various forms of apparatus will be disclosed hereinafter for carrying out the method of the present invention, a preferred form of apparatus for performing the method includes a novel form of ignition distributor rotor suitable for use in a normal distributor for an internal combustion engine. Said apparatus includes a nonconductive body adapted to be driven, a contact member supported by the body and adapted to engage the central contact of a normal distributor cap. A first spark-gap electrode is supported by the body and connected to the contact member to provide an electrical path to the equally spaced terminals in the distributor cap. A second spark-gap electrode forming an electrically conducting path is angularly displaced from the first spark-gap electrode with means being provided for connecting the second electrode to the central contact and said second spark-gap electrode forming a spark-gap of lesser dimensions with the terminals of the cap than the first spark-gap electrode when said rotor is operated above a predeterminable minimum speed of rotation.

Further objects and advantages of the present invention will become apparent from the following detailed description taken in conjunction with the accompanying drawings.

In the drawings,

Fig. 1 is a composite graph illustrating the relationships between the four cycles of a spark-ignition internal combustion engine and the operation of the intake and exhaust valves.

Figs. 2–A and 2–B illustrate the two operating conditions of a distributor rotor constructed in accordance with the preferred form of apparatus for carrying out the present invention.

Figs. 3–A and 3–B are illustrations of an alternative form of distributor rotor suitable for performing the method of the present invention and illustrating the two operating conditions for the rotor.

Figure 1:
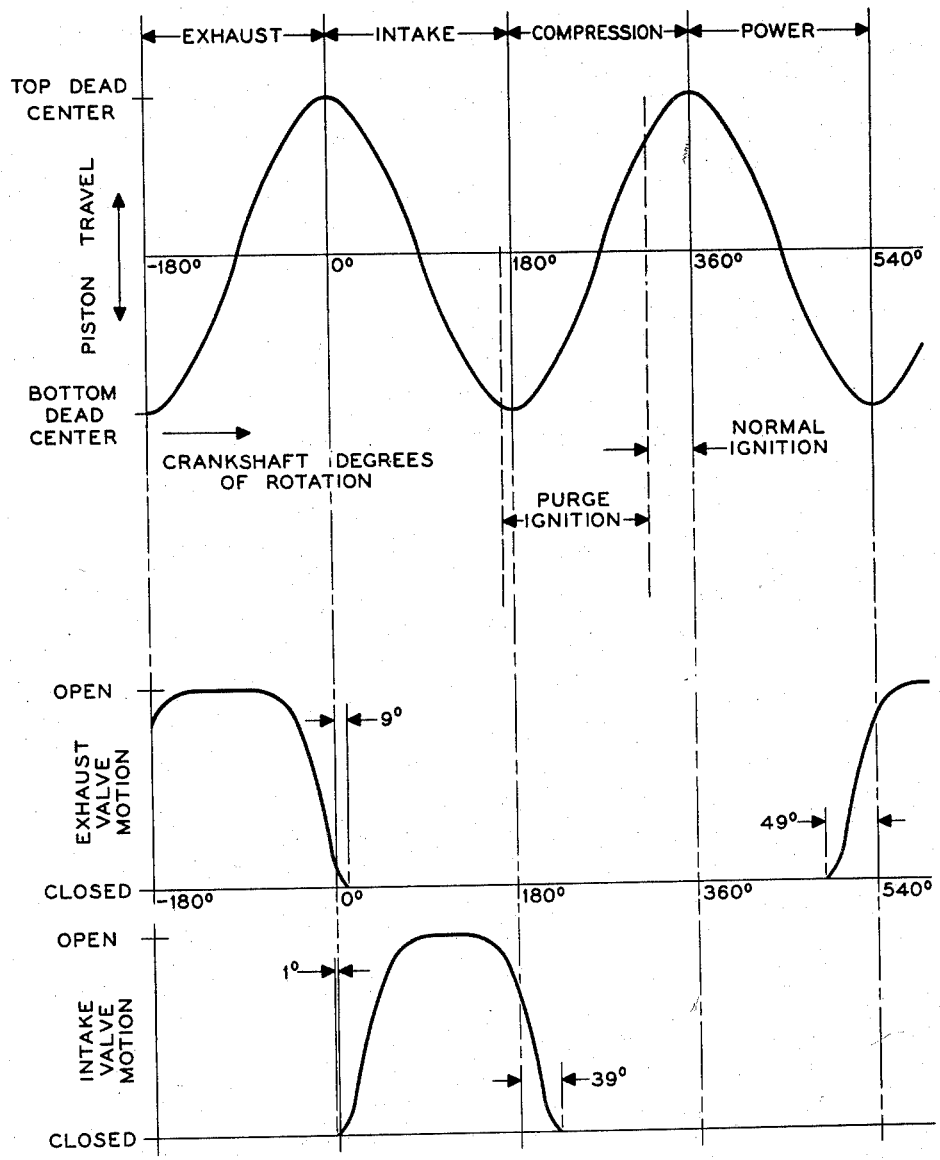

Referring now to the drawings, and in particular to Fig. 1, it will be observed that the piston travel has been plotted against crank shaft degrees of rotation, with the individual strokes of the piston in the combustion chamber with which it is associated identified as "exhaust," "intake," "compression" and "power." The above-described plot of piston travel identifies in general the movement of a piston associated with the combustion chamber during its four strokes in a spark-ignition engine to which the present invention may be applied. It will be apparent to those skilled in the art that the present invention may be effectively applied with equal advantage to a two-stroke cycle spark-ignition engine.

As stated hereinbefore, the present invention is directed to the method of removing combustion chamber deposits accumulated in an internal combustion engine during normal operation thereof by radically advancing the spark ahead of the point in the piston travel at which the combustible mixture would be ignited normally. The normal ignition point has been identified as a band of approximately 45 degrees width ahead of top dead center when the piston is between the compression and power strokes.

In order to explain the reason for this normal ignition being identified as a band of this width, it will be desirable at this point to explain the advances in spark which occur during normal operation of a spark-ignition, high-compression engine. In general, these spark advances are present as a result of three individual advances which are present in varying degree dependent upon the operating condition of the engine. The first of these advances is that due to basic timing as recommended by the manufacturer of the engine. This advance may be in the order of 0 to 5 degrees ahead of top dead center and is normally adjusted with the engine idling at about 300 to 500 R. P. M. The second advance normally present in high-compression spark-ignition engines is introduced by a centrifugal advance mechanism present in the distributor. This centrifugal advance mechanism is constructed so that, upon increase in speed of the engine and the distributor, the spark is normally advanced from about 5 to 15 degrees over and above the basic spark advance. The third spark advance normally present in high-compression spark-ignition engines is introduced by the vacuum of the intake manifold. This advance may be in the range of 15 to 20 degrees when the engine is operated at part throttle. In normal commercial construction of most automobile engines, this vacuum advance of the spark ignition is entirely cut out by full throttle operation of the engine at low speeds. In some engines, such as those used in late model Ford automobiles, spark advance is determined entirely by vacuums produced in the venturi section of the carburetor and the intake manifold, without the use of mechanical centrifugal advance.

From the foregoing description it will be appreciated that normal ignition will depend upon the speed and operating condition of the engine and may occur up to about 45 degrees before top dead center in the travel of the piston. In the operation of some very high-speed engines, the spark advance may be advanced to an even greater degree, since time is required for burning the mixture. Under high-speed operating conditions, this may require ignition of the fuel-air mixture at a much earlier time in order that maximum power may be obtained.

Accordingly, it will be understood that the portion of the graph in Fig. 1 identified as "normal ignition" will be of varying width but in general will be equivalent to 45 degrees or less of crank shaft rotation. In accordance with the present invention, we have found that by igniting the combustible mixture normally drawn into a combustion chamber while the engine is operating on tank fuel at a time earlier than said normal ignition, it is possible to obtain destruction of the combustion chamber deposits in a highly effective manner. The exact point in the rotation of the crank shaft at which the combustible mixture is ignited is identified in the graph as that portion identified as "purge ignition." We have found that such purge ignition may occur at a point several degrees ahead of bottom dead center while the piston is on the intake stroke. In general, this point is limited only by the intake stroke being sufficiently completed to draw into the chamber the combustible mixture and the intake valve being less than completely open. Specifically, the ignition may occur as early as 10 degrees of crank shaft rotation before bottom dead center on the intake stroke of the piston.

We are not fully aware of the mechanism by which combustion chamber deposits are removed by radically advancing the spark. However, we have found that when said spark is made to occur within the range identified as "purge ignition" on the graph in Fig. 1, destruction of the deposit occurs and we believe that this may result because of thermal shock and burning of said deposits which is induced by initiating the burning of the fuel-air mixture in the combustion chamber while the piston is on the compression stroke and then maintaining the combustion products in the combustion chamber during the power stroke of the engine.

In experimental runs with an internal combustion engine operated in accordance with the present invention, we have found that it is possible to reduce the octane requirement of an engine to within one octane number of the cleaned requirement of that engine. As stated hereinabove, the physical and chemical reactions which result in the destruction of combustion chamber deposits by operating of an engine in accordance with the invention are not fully known, and accordingly the invention is not limited to the correctness of the theory expounded above.

In the preferred form of the invention, the method of removing combustion chamber deposits is carried out by advancing the ignition of the individual cylinders in an operating spark-ignition engine after the engine has been started and run with normal ignition during a warm-up period. The ignition is then advanced into the range of purge ignition, as described in Fig. 1 and the engine operated at full throttle for a period of about three minutes. Maximum obtainable speeds under purge operating conditions are in the neighborhood of about 3000 R. P. M. even with no external load, because of the large amount of power required to compress the burning mixture in the combustion chambers. Sometimes the coolant in the water jacket of the engine approaches the boiling point during purging. Such boiling is induced by the greatly increased heating effect induced by compressing a burning mixture of the fuel and air and then maintaining that burning and the combustion products within the chamber until the normal opening of the exhaust valve. The relationship between the opening and closing of the exhaust and intake valves for a typical engine is indicated in the lower portion of the graph, Fig. 1.

While various forms of apparatus may be used to perform the method of the present invention, several of which will be described in connection with the remaining figures of the drawings, there is illustrated in Figs. 2-A and 2-B, and an alternative form thereof in Figs. 3-A and 3-B, novel apparatus to permit normal starting and idling of the engine which is further adapted to advance radically the spark ignition of an engine. As particularly shown in Figs. 2-A and 2-B, this apparatus comprises a novel construction for an ignition distributor rotor 20 having a nonconducting body 21 provided with a normal or first electrode 22 adapted to make electrical connection during starting and idling of the engine with a row of equally spaced terminals 23 in the distributor cap. These terminals are normally connected to the spark plugs of the engine. In addition to the first electrode arm 22, which is connected through bar 24 to a central contact 25 adapted to engage the central contact of the distributor cap, rotor 20 is provided with a second spark-gap electrode arm 26 supported by body 21 and connected to the central contact member 25 through bar 27. As particularly shown in Fig. 2-B, second electrode arm 26 is movable outwardly by centrifugal force from the position illustrated in Fig. 2-A to that shown in Fig. 2-B. The speed at which such centrifugal force, due to rotation of rotor 20, occurs will, of course, be determined by the design of the leaf spring material from which arm 26 is constructed with the spring tension of arm 26 being selected to effect purging at engine speeds above about 1500 R. P. M. Arm 26 will attain the position illustrated in Fig. 2-B so that the contact 28 approaches the row of terminals 23 at a distance $d2$, which is less than the normal spacing between the first electrode and the row of terminals identified as $d1$. Movable arm 26 is guided in its motion and limited in its radial movement by a fixed member 29 adapted to engage a slot formed in electrode arm 26.

In the operation of the rotor illustrated in Figs. 2-A and 2-B, the engine may be started and idled with the distributor rotor operated as shown in Fig. 2-A, thereby permitting each of the electrodes 23 to be energized by first electrode 22 and thus provide normal ignition for the engine. Upon increase in the speed of the engine, movable arm 26 is forced outwardly into the position shown in Fig. 2-B and thereby provides a preferential path to the electrodes, which, in the present instance, are so arranged that each spark plug is energized one-eighth of a cycle earlier than would normally be its time of ignition. Accordingly, there is provided in a normal four-stroke-cycle engine having eight cylinders an advance of 90 degrees in the timing of the ignition. This 90-degree advance is, of course, over and above the normal advances present in the engine for the speed and other operating conditions of that engine.

An alternative arrangement for radically advancing the spark in accordance with the method of the present invention by adjustment of the rotor of the distributor is shown in Figs. 3-A and 3-B. In that arrangement the second electrode 26A is mounted on body 21 and has a fixed relationship between the contact end thereof 28A and the fixed row of terminals in the distributor cap. However, the second electrode 26A is not permanently connected to central contact 25 of the rotor body but, rather, is connected thereto by a movable contact means 30, which is subjected to centrifugal force and closes the contacts at the inner end of bar 26A and the outer end of movable arm 30. These contacts are identified as 31 and 32, respectively. The operation of the arrangement of Figs. 3-A and 3-B is believed self-evident from the above description and serves to provide a preferential path to the row of spark plug terminals 23 of width $d2$ when rotor body 21 is rotated above a predeterminable minimum speed. The arm 26A in the arrangement of Figs. 3-A and 3-B has a fixed angular relationship to the first electrode 22 such that the spark for each cylinder may be advanced one-eighth of the two revolutions, or 90 degrees ahead of its normal sparking time.

Figure 4:
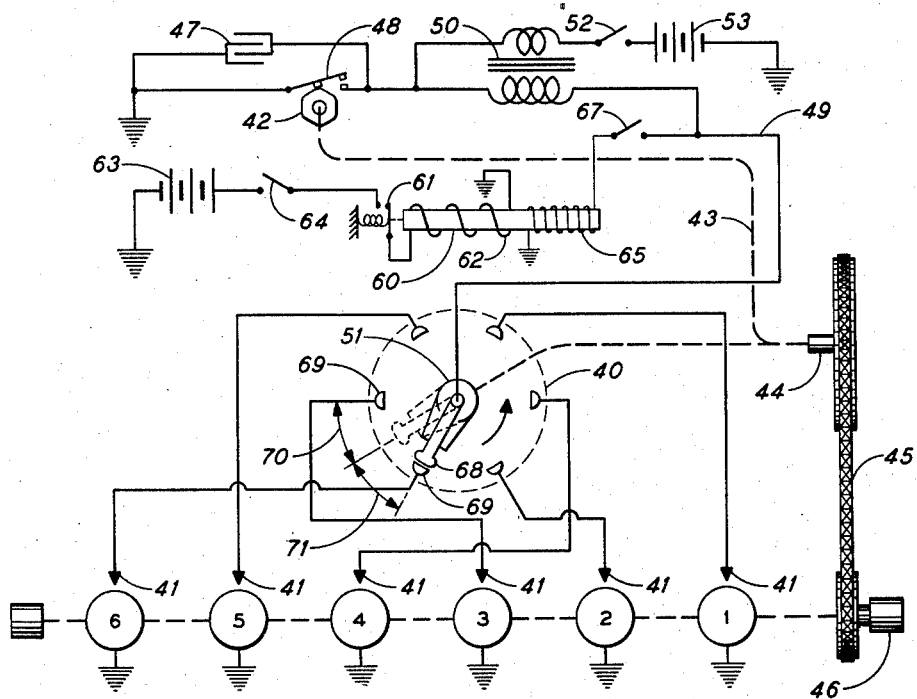
Fig. 4 is a schematic representation of another form of apparatus for carrying out the method of the present invention which includes an independent spark-ignition source including a vibrator.

Referring now to Fig. 4, there is illustrated another form of apparatus suitable for carrying out the method of the present invention. In the arrangement of Fig. 4 there is illustrated schematically the normal spark-ignition system, including a distributor 40, for a six-cylinder engine indicated generally by the cylinders numbered 1 to 6, inclusive, each of which is provided with a spark plug 41. As will be understood by those skilled in the art, the basic timing of the spark appearing at spark plugs 41 is controlled by the position of cam and breaker assembly 42 driven as indicated schematically by dashed line 43 by the cam shaft 44 and timing chain 45 from the crank shaft 46. In normal operation, opening and closing of switch 48 of cam and breaker assembly 42 produce, by means of induction coil 50, a high voltage in line 49, which is transmitted to distributor rotor 51. As further shown, the normal ignition system for the engine includes a condenser 47 in parallel with the switch 48 and an ignition switch 52 for connecting the battery 53 or generator (not shown) to the primary of coil 50.

As stated above, the normal timing of the engine is under the control of cam and breaker assembly 42, and so long as the distributor rotor is substantially closer to one of the terminal electrodes than to another electrode at the time the switch 48 makes and breaks its contact, the potential induced by coil 50 in line 49 will permit proper firing of the corresponding cylinder to burn the fuel-air mixture during the power stroke.

In accordance with the present invention, there is provided, in addition to the normal spark-ignition system, a means for introducing a high potential through line 49 which is both continuously available and of high frequency. In the present instance, this independent source of high potential is generated by auxiliary coil 60 having a vibrator arm 61, which is intermittently opened and closed at any predeterminable rate by the action of the core of coil 60 on switch arm 61. Switch arm 61 is arranged to connect the primary 62 of coil 60 to a potential source indicated as battery 63 through switch 64. A continuous high potential is induced in secondary winding 65 by the making and breaking of vibrator arm 61, and this high potential may be applied to line 49 and distributor 51 through switch 57. In the operation of the arrangement of Fig. 4, the rotating electrode 68 may have continuously applied thereto the potential generated by auxiliary coil 60 so that, upon normal rotation of rotor 51, the spark from the end of electrode 68 will continuously arc to the nearest of either of two electrodes 69, between which it is then located. For example, with rotor 51 turning in the direction indicated by the arrow, electrode 68, when in the dotted position shown in the drawing, will preferentially jump to the terminal connected to the No. 6 cylinder rather than to the No. 3 cylinder when the circumferential distance 71 becomes slightly less than the circumferential distance 70. Accordingly, it will be seen that an advance of one-twelfth of the normal two revolutions of rotation of the crank shaft may be achieved in a six-cylinder engine of the type shown in Fig. 4. Accordingly, there may be produced 60 degrees of spark advance over and above the normal spark advance of the engine operating at a particular speed and load by the arrangement shown in Fig. 4. In accordance with another aspect of the present invention, the arrangement of Figs. 2–A and 2–B, as well as those of Figs. 3–A and 3–B may be combined with the spark advance method disclosed in Fig. 4 to obtain additional advance in the spark of the combustion chamber to produce a more radical spark advance. For example, in a six-cylinder engine, the spark advance obtained by the combination of the arrangement of Fig. 4 with the rotors disclosed in Figs. 2 and 3 will produce an advance of 180 degrees ahead of normal spark ignition for the engine; and, in an eight-cylinder engine, the corresponding advance will be 135 degrees.

Figure 5:
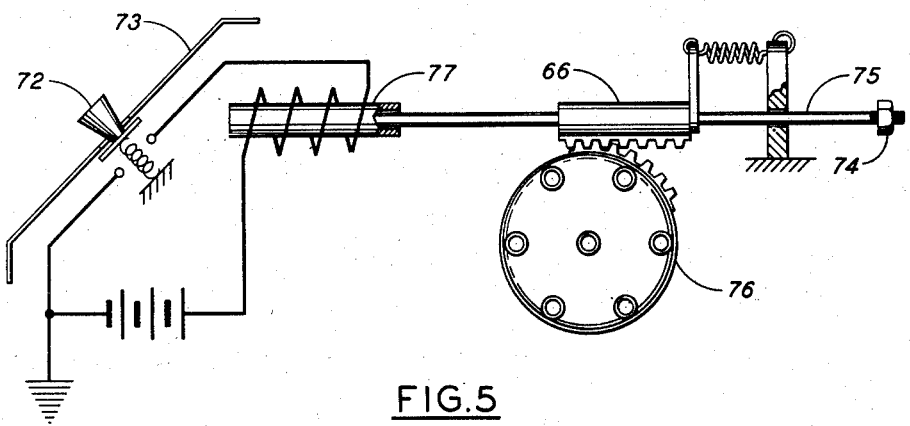
Fig. 5 is a schematic representation of another form of apparatus for performing the method of the invention and particularly illustrates an apparatus for rotation of a distributor cap.

Referring now to the arrangement of Fig. 5, there is shown an alternative arrangement for advancing the spark which is particularly useful for periodic purging of combustion chamber deposits during operation of an internal combustion engine such as those used in automobiles. In the arrangement of Fig. 5 a rack and pinion arrangement 66 is adapted to rotate the cap, or alternatively the body, of a distributor by a predeterminable amount by energization of solenoid 77 through depression of a push button 72. The push button 72 may be conveniently located on the instrument panel 73 in the operating compartment of the automobile. Adjustment of the movement of degrees of advance by the energization of solenoid 77 may be conveniently provided by adjustment of stop nut 74 on the end of rod 75 and thereby limit the number of degrees of rotation of the distributor 76 by rack and pinion arrangement 66.

Figure 6:
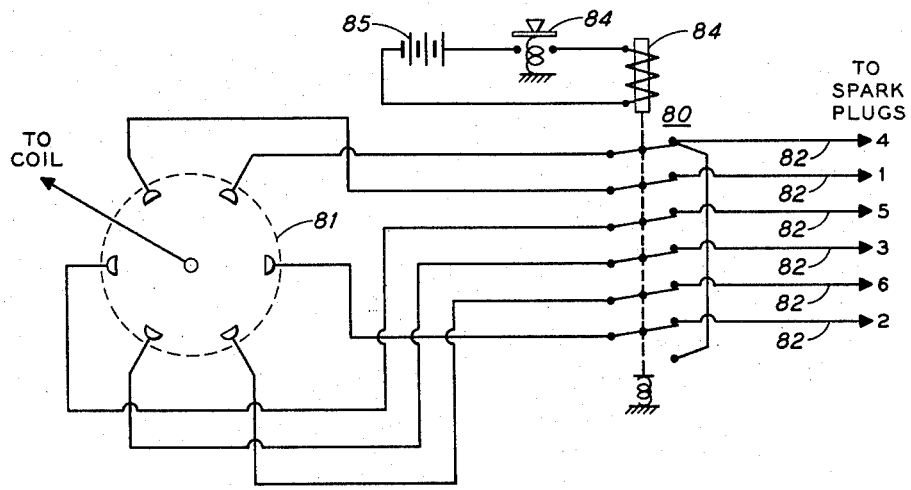
Fig. 6 is a schematic representation of another form of apparatus for carrying out the method and includes means for switching simultaneously each of the spark plug leads connected to a distributor.

Referring now to the arrangement of Fig. 6, it will be seen that a switching mechanism, identified generally as 80, may be provided for switching simultaneously the leads from a distributor cap 81 to the individual spark plug leads identified as 82. It will be seen in Fig. 6 that the operating coil 84 may be energized by battery 85 through push button 86.

In the operation of the arrangement of Fig. 6, switch 80 may be energized after the engine has been started and idled for a particular period of time, and the spark ignition may be advanced in each of the cylinders of the operating engine by at least the interval between the terminals in the cap of the distributor. In the arrangement of Fig. 6 this advance amounts to one-sixth of two revolutions, or 120 degrees.

In addition to the apparatus described in connection with Figs. 2 to 6, inclusive, additional means may be utilized for advancing the spark in manner to perform the method of the present invention. Among these methods is that of rotating the body of the distributor after the engine has been started.

Another method for inducing radical advance of the spark may include the introduction of oxidizable particles of the order of about 200 to 300 mesh, such as carbon, and carbon-containing particles whose oxidation is catalyzed by metals such as lead, copper, and calcium, through the induction system of the engine. It has been found that by such introduction of particles to the combustion chamber, such particles may be brought to incandescence during a normal ignition and burning of the fuel-air mixture and the particles retained in the combustion chambers during the subsequent exhaust and intake strokes of the engine and then induce ignition of the fuel-air mixture during the compression stroke and at a time sufficiently early to cause destruction of the combustion chamber deposits present in the engine cylinder.

From the foregoing description of the various forms of apparatus and means for producing a radical advance in the spark ignition of an operating internal combustion engine, it will be appreciated that the method broadly comprehends the steps of igniting the fuel-air mixture in the combustion chambers of an operating engine during the compression stroke and maintaining the combustion products in the engine cylinder until the exhaust valve opens. In this way the burning mixture and the combustion products are held in the combustion chamber for about 225 degrees to 370 degrees of crank shaft rotation. By such abnormal increase in the operating temperature of the combustion chamber by virtue of the present invention, the temperature of the deposits accumulated in the chamber during normal engine operation is raised sufficiently to cause burning and volatilization of the deposits. These temperatures are in part attained by continuation of the operation of the cylinder through a large number of cycles of preignition of predeterminable amount. Accordingly, it will be understood that removal of the deposits is achieved only by repetitive preignition rather than by sporadic or occasional preignition as may be encountered in normal engine operation.

Various modifications and changes in the method and apparatus for carrying out the present invention will become apparent to those skilled in the art from the foregoing description. All such modifications and changes which fall within the scope of the appended claims are intended to be included therein.

We claim:

1. An ignition distributor rotor having a nonconductive body adapted to be connected with a driving shaft, a contact member supported by said body and adapted to engage the central contact of a distributor cap, said cap having a row of equally spaced terminals for connection with spark plugs, a first spark gap electrode supported by said body and connected with the contact, said first electrode extending beyond the rotor body to form an electrically conductive path to said row of terminals, a second spark gap electrode supported by said body, said second electrode forming an electrically conductive path extending outwardly from said body and angularly displaced from said first spark gap electrode, and means for connecting said second electrode to said contact, said second spark gap electrode forming spark gap of lesser dimensions with each of the terminals of said row of terminals than the spark gap between said first spark gap electrode and said terminals when said rotor is operated above a predeterminable speed of rotation.

2. A rotor for a distributor of a spark-ignition, internal combustion engine comprising a rotatable, nonconductive body, contact means supported by said body and adapted to engage the central contact of a distributor cap having a row of terminals for connection with the spark plugs of said engine, a first spark gap electrode means supported by said body and in electrical connection with said contact means, and a second spark gap electrode means including an electrode member forming an electrically conductive path supported at its inner end by said rotor body and means responsive to centrifugal force produced by rotation of said body for energizing the gap between the outer end of said electrode member and said row of terminals in said cap.

3. A rotor in accordance with claim 2, in which said electrode member has a fixed radial length greater than the radial length of said first spark gap electrode means and said means responsive to centrifugal force includes a contact arm electrically connected to said contact means movable into engagement with said electrode member.

4. A rotor in accordance with claim 2, in which the outer end of said electrode member is movable radially and said means responsive to centrifugal force includes means for limiting the radial movement of said electrode member for predetermining the position of said outer end closer to said row of terminals than said first spark gap electrode means.

No references cited.